United States Patent [19]

Ratcliff

[11] 4,358,298
[45] Nov. 9, 1982

[54] MOTORIZED GAS TRAP

[76] Inventor: Elmer G. Ratcliff, Rte. 1, Box 175, Powell, Wyo. 82435

[21] Appl. No.: 300,817

[22] Filed: Sep. 10, 1981

[51] Int. Cl.³ .............................................. B01D 19/00
[52] U.S. Cl. ...................... 55/185; 55/190; 55/203; 366/137; 366/184; 366/262; 366/286
[58] Field of Search ............... 55/185, 189–193, 55/201, 203; 366/137, 184, 190, 194, 262, 270, 284–286

[56] References Cited

U.S. PATENT DOCUMENTS

| | | |
|---|---|---|
| 254,157 | 2/1882 | Roat .................................. 366/286 |
| 258,265 | 5/1882 | Tonkin ............................... 366/286 |
| 2,096,174 | 10/1937 | Hamill ................................. 55/201 |
| 2,663,379 | 12/1953 | Doan .................................. 55/192 |
| 2,704,658 | 3/1955 | Gordon ............................ 55/203 X |
| 2,792,072 | 5/1957 | Moore ................................. 55/203 |
| 3,271,929 | 9/1966 | Bowden et al. ................... 55/203 X |
| 3,831,352 | 8/1974 | Parcels ................................ 55/193 |
| 3,999,965 | 12/1976 | Burgess ............................ 55/203 X |
| 4,046,528 | 9/1977 | Liljestrand ....................... 55/192 X |
| 4,084,946 | 4/1978 | Burgess ........................... 55/192 X |
| 4,214,879 | 7/1980 | Whetstone et al. .................. 55/191 |
| 4,272,258 | 6/1981 | Shifflett ........................... 55/203 X |

FOREIGN PATENT DOCUMENTS 173448  1/1922  United Kingdom ............... 366/286

*Primary Examiner*—Robert H. Spitzer
*Attorney, Agent, or Firm*—Harvey B. Jacobson

[57] ABSTRACT

A gas trap used to separate at least a portion of the gases entrained in drilling fluids used in an oil well drilling operation which is associated with the shale shaker box and an analyzer such as a hot wire analyzer. The gas trap includes a receptacle or can vertically adjustably supported from the shaker box by a supporting assembly with the can including a top supporting the can by a unique connecting assembly enabling rotational adjustment of the can about a vertical axis to orient the inlet and outlet from the can in a desired location in relation to the shaker box. The top is provided with a standpipe and a motor shaft extends through the top and is provided with plastic fingers radiating from the lower end thereof for agitating the drilling fluid to assist in gas removal.

7 Claims, 6 Drawing Figures

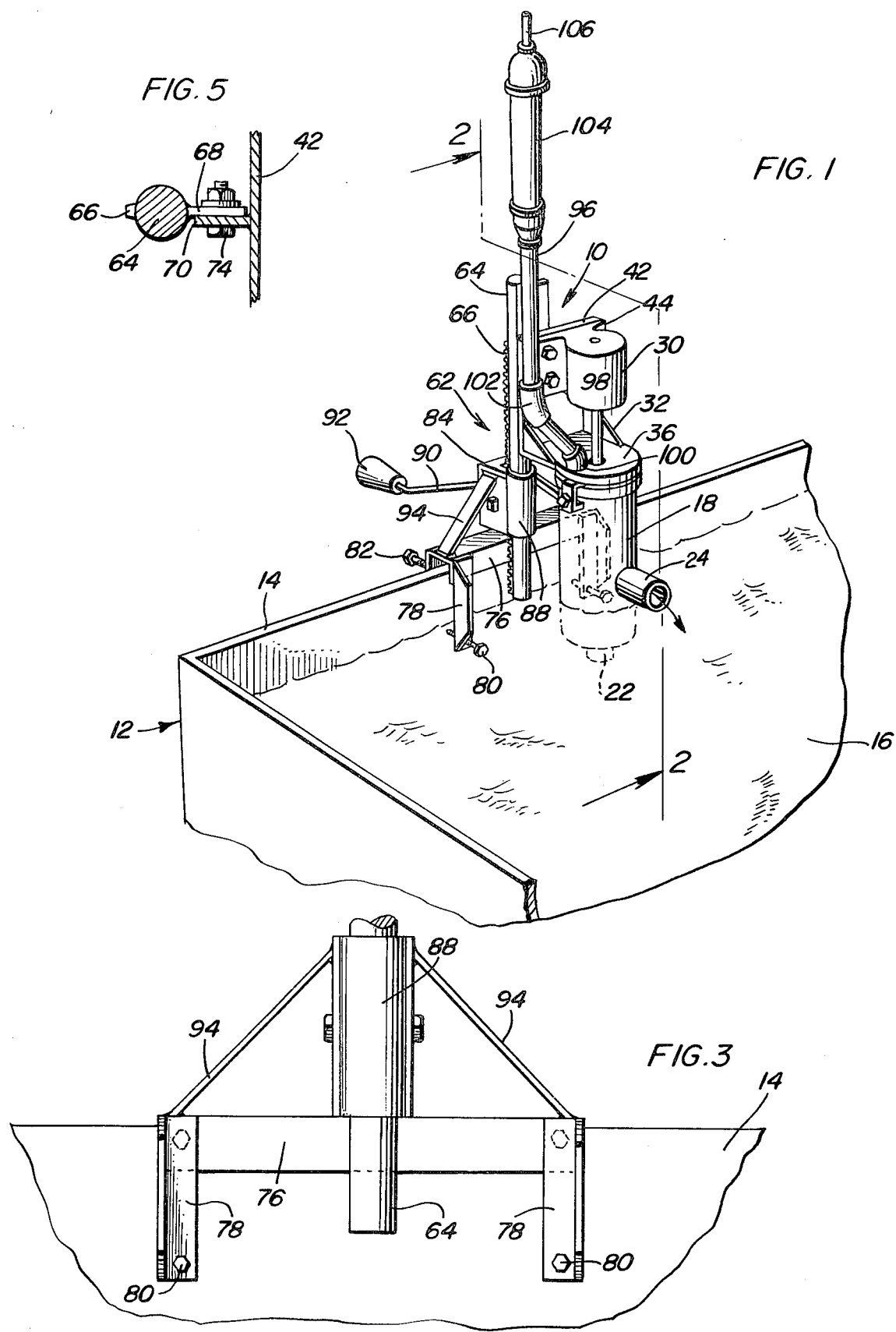

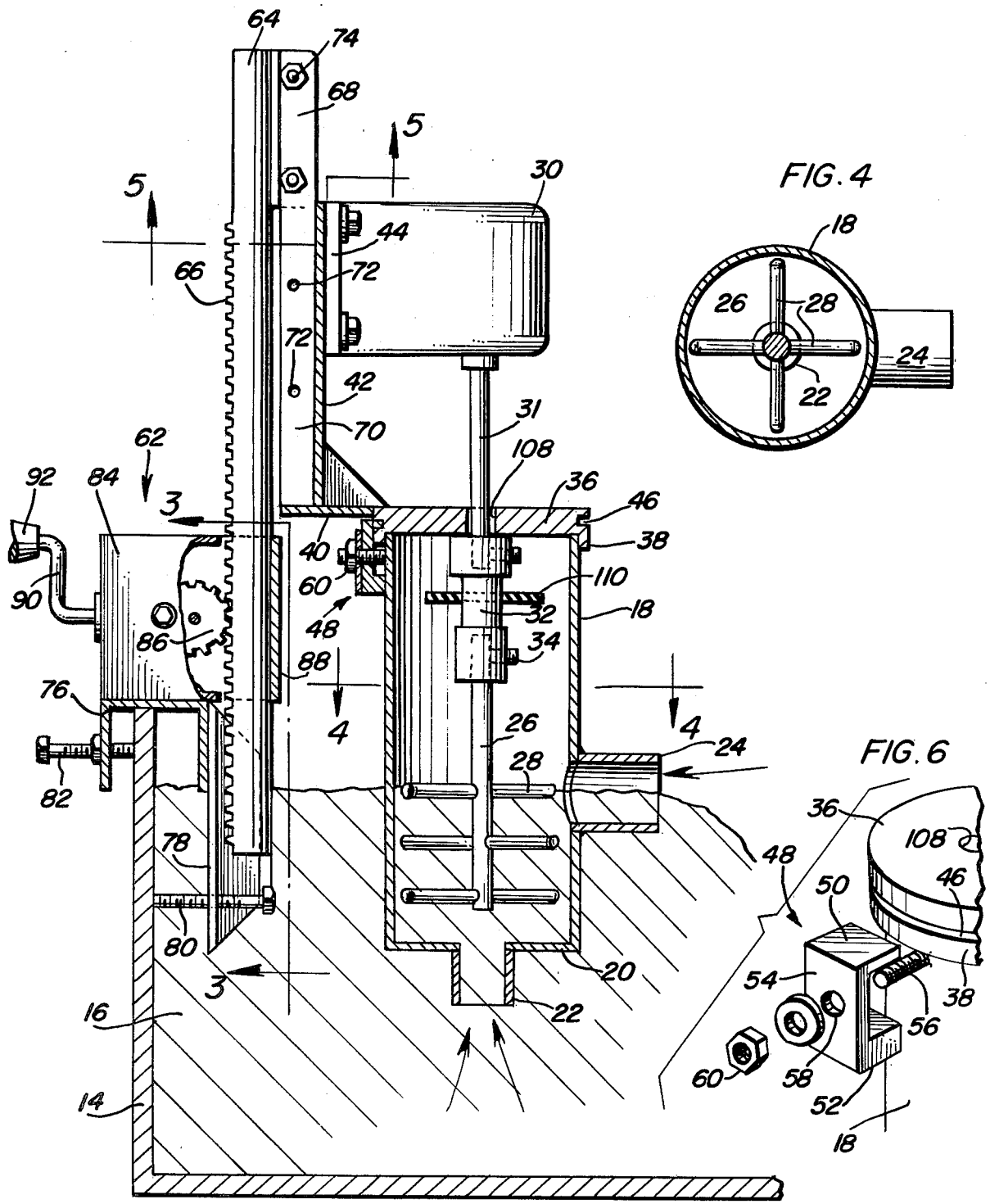

MOTORIZED GAS TRAP

BACKGROUND OF THE INVENTION

1. Field of the Invention

The present invention generally relates to a gas trap and more particularly a motorized gas trap having plastic fingers connected to a shaft depending into a container through which drilling fluid passes and which is subject to a vacuum for effectively removing part of the gases from the drilling fluid so that the gases may be analyzed with the container or can being rotatably supported from a top member by a unique connection and vertically adjustably supported by a unique mounting and supporting structure.

2. Description of the Prior Art

Many devices have been provided to remove entrained gases from various liquids or other flowable material which basically involve agitation of the flowable material while subjecting the same to a vacuum. In well drilling operations, drilling fluids are circulated in relation to the well in a well known manner and such drilling fluids entrain gases from the formation and these gases are analyzed to provide information with respect to the formation being drilled. The following U.S. patents disclose various degassing devices and the concept of analyzing the removed gases.

U.S. Pat. Nos. 4,084,946, 3,831,352, 2,096,174, 2,663,379, 4,046,528, 2,704,658, 3,271,929, 3,999,965 and 4,272,258.

While the above patents disclose various devices for agitating a drilling fluid or the like and separating gases therefrom and also disclose the concept of analyzing such gases, the structure and operation of the previously patented devices is substantially different from the present invention.

SUMMARY OF THE INVENTION

An object of the present invention is to provide a gas trap including a can having a bottom inlet and side outlet supported from a top which forms a closure for the can by a unique connection which enables the can to be adjusted about a vertical axis to provide 360 degree rotation without removal of the can from the top so that it can be adjusted to most effectively fit various types of shaker boxes.

Another object of the invention is to provide a gas trap in accordance with the preceding object in which a cam latch interconnects the can and the top thereof which enables the can and the trap discharge or outlet to be rotated into desired position about a vertical axis.

A further object of the invention is to provide a gas trap in accordance with the preceding objects in which the top of the can includes a standpipe connected thereto and extending therefrom in an inclined or offset manner to facilitate the gases being removed from the can for analysis.

Still another object of the present invention is to provide a gas trap in accordance with the preceding objects in which a motor shaft extends through the top and terminates adjacent the bottom inlet on the can with the shaft including plastic fingers rigidly attached thereto for agitating the drilling fluid in the lower portion of the can to facilitate separation of gases from the fluid due to the can being under vacuum conditions.

Yet another object of the invention is to provide a gas trap in accordance with the preceding objects which includes a supporting structure for detachably supporting the trap from the side wall of a shaker box or the like and providing manual adjustment in the form of a rack gear and pinion gear assembly whereby the gas trap can be optimally positioned with respect to the drilling fluid level in the shaker box.

Still another important feature of the invention is to provide a motorized gas trap for use on an oil well drilling rig in order to separate a portion of the gases (hydrocarbons) from the drilling fluids so that such gases may be analyzed in a manner well known with the gas trap being quite versatile in installation, capable of adjustment to maintain optimum operating conditions and relatively inexpensive to manufacture, maintain and operate.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a perspective view of the motorized gas trap of the present invention installed on a shaker box for drilling fluid.

FIG. 2 is a vertical sectional view, on an enlarged scale, taken substantially upon a plane passing along section line 2—2 of FIG. 1 illustrating the structural details of the gas trap.

FIG. 3 is an elevational view of the supporting bracket structure taken along reference line 3—3 of FIG. 2.

FIG. 4 is a transverse, sectional view taken substantially upon a plane passing along section line 4—4 of FIG. 2 illustrating the details of the motor shaft and plastic fingers thereon.

FIG. 5 is a detailed sectional view taken substantially upon a plane passing along section line 5—5 of FIG. 2 illustrating further structural details of the supporting structure.

FIG. 6 is a fragmental perspective view illustrating the connection between the can and can top which enables the can to be rotated about a vertical axis when the connecting mechanisms is loosened.

DESCRIPTION OF THE PREFERRED EMBODIMENT

Referring to the drawings, the gas trap of the present invention is generally designated by reference numeral 10 and is illustrated in operative position with respect to a shaker box generally designated by the numeral 12 which includes a wall 14 and a quantity of drilling fluid or mud 16 therein which is normally oriented at a particular elevation although the elevation of the drilling fluid or mud may vary in the shaker box. Also, shaker boxes vary considerably in size, shape and configuration. The drilling fluid or mud is circulated through the drill string and returns from the formation in a well known manner and the gas trap of the present invention removes a portion of the gases or hydrocarbons entrained in the drilling fluid and discharges them into an analyzer of conventional construction such as a hot wire analyzer. Inasmuch as this basic technique is known, the analyzer is not disclosed in this application with it being understood that the gas trap supplies the removed gases to the analyzer.

The gas trap 10 includes a substantially cylindrical and vertically disposed can 18 having a bottom wall or plate 20 provided with a cylindrical inlet 22 in the center thereof which may be in the form of a depending cylindrical pipe nipple or the like. Likewise, the periphery of the can 18 is provided with a laterally extending outlet 24 which may also be in the form of a cylindrical pipe nipple welded to the can with it being understood that the drilling fluid 16 will enter through the inlet 22 and be discharged out through the outlet 24 with the interior of the can being subjected to a vacuum so that a portion of the gases entrained in the drilling fluid will be removed from the surface of the drilling fluid within the can 18.

In order to facilitate the separation of the gases from the drilling fluid, a centrally disposed shaft 26 is provided in the can and the lower end thereof terminates slightly above and in alignment with the inlet 22 as illustrated in FIG. 2. The shaft 26 is provided with a plurality of diametrically extending plastic rods which form radial fingers 28 fixedly secured to the shaft 26 in 90 degree angularly displaced relationship as illustrated in FIG. 4 so that the plastic fingers 28 will agitate the drilling fluid 16 when the shaft 26 is driven.

A motor, such as an electric motor 30 having an output shaft 31 is positioned above the can and is drivingly connected to the shaft 26 by a shaft coupling 32 secured to the motor output shaft and the shaft 26 respectively by fasteners such as set screws, bolts or the like 34. Thus, when the motor 30 operates, the shaft 26 and the fingers 28 will be rotated at a desired speed.

The upper end of the can 18 is closed by a top plate 36 provided with a depending flange 38 which telescopically receives the open upper end of the can 18. The top plate 36 includes a laterally extending plate 40 which has an upwardly extending plate or bracket 42 rigidly affixed thereto. The vertical plate 42 has a base 44 of the motor 30 secured thereto in order to properly orient the motor 30 and shaft 26. The depending flange 38 on the top plate 36 is provided with a peripheral groove 46 spaced intermediate the top and bottom edges of the flange 38. A cam 48 is provided at circumferentially spaced points (120 degrees apart) to secure the can 18 to the top plate 36 in a secure manner but yet in a manner which will enable the can 18 to be rotated 360 degrees about a vertical axis. The cam includes an upper leg 50 and a lower leg 52 and a web 54 interconnecting the legs 50 and 52 with the legs 50 and 52 being parallel but perpendicular to the web 54. The inner edge of the leg 50 is received in the groove 46 and the inner edge of the lower leg 52 engages the periphery of the can 18. A threaded stud 56 rigidly affixed to the can 18 by welding or the like projects outwardly through an opening 58 in the web 54 and a retaining nut and washer assembly 60 is placed on the outer end of a stud 56 to retain the cam 48 in position and to tighten the cam 48 thereby rigidly securing the can 18 to the top plate 36. Thus, by loosening the nuts 56, the can 18 can be rotated about a vertical axis thus orienting the trap discharge or outlet 24 in any desired relationship to the walls, corner or the like of the shaker box 12.

In order to support the can 18, the top plate 36, the motor 30 and the plate 42 from the wall 14 of the shaker box 12, a supporting structure generally designated by numeral 62 is provided which includes an elongated vertical shaft 64 of cylindrical configuration having a rack gear 66 formed on or secured to one side thereof. At the diametrically opposed side of the vertical shaft or rod 64 is a mounting bracket 68 projecting there from for adjustable attachment to a vertical mounting bracket 70 fixed to the central vertical center of the plate 42 with the lower edge of the bracket 70 engaging and fixed to the plate 40. The bracket 70 and the bracket 68 have a plurality of vertically spaced apertures 72 therein receiving fastening bolts 74 which rigidly but detachably interconnect the brackets 68 and 70 with the plurality of apertures 72 enabling vertical adjustment of the attachment point. With this construction, the vertical shaft or rod 64 and the rack gear 66 are rigidly connected with the motor 30, top plate 36 and can 18.

The supporting structure 62 also includes an inverted channel shaped bracket 76 generally perpendicular to the axis of the vertical shaft 64 and which is positioned over top of the upper edge of the side wall 14 of the shaker box 12 as illustrated in FIG. 2. The inner leg of the channel shaped bracket 76 includes a pair of depending brackets 78, one located at each end of the bracket 76. The depending brackets 78 are of angled shape and provided with a threaded clamp bolt 80 extending through the lower end portion thereof with the inner end engaging the inner surface of the side wall 14. The outer leg of the channel shaped bracket 76 is provided with similar screw threaded clamp bolts 82 which extend therethrough and engage the outer surface of the side wall 14 with the clamp bolts 80 and 82 being oriented to vertically position the mounting structure so that the vertical shaft or rod 64 will be vertically oriented with the bolts 80 and 82 not necessarily rigidly clamping the channel shaped bracket 76 to the wall 14 of the shaker box 12. However, other clamping mechanisms may be provided to fixedly and adjustably secure the gas trap 10 to the wall 14 if desired.

Extending upwardly from the center of the channel shaped bracket 76 is a gear housing 84 having a pinion gear 86 journaled therein and in meshing engagement with the rack gear 66 which extends downwardly through a sleeve 88 that is rigidly connected with the housing 84. The sleeve 88 closely and guidingly receives the vertical shaft or rod 64 with the rack gear 66 meshing with the pinion gear 86. The pinion gear 86 is connected to and driven by a hand crank 90 having a handle 92 on the outer end thereof with the drive connection between the crank 90 and the gear 86 being in the form of a worm and pinion gear or other reduction gear which has a gear ratio such that the crank 90 will stay in position even though longitudinal force may be exerted on the vertical shaft or rod 64. Yet, when the crank 90 is rotated, the gear 86 will be driven and the rack gear 66 and the shaft or rod 64 will be raised or lowered depending upon the direction of rotation of the crank 90. To stabilize the gear housing 84 in relation to the channel shaped bracket 76, inclined braces 94 are provided between the outer ends of the channel shaped bracket 76 and the upper end portion of the gear housing 84 as illustrated in FIGS. 1 and 3.

The top member 36 has a standpipe 96 communicated therewith through an angulated pipe member 98 that is connected to a fitting 100 attached to the top plate 36 in offset relation to the center thereof. The standpipe 96 may be offset to either side to pass the motor 30 and is vertically oriented and connected to the pipe member 98 by an angle fitting 102 which enables the standpipe to be oriented vertically in generally parallel relation to the vertical shaft or rod 64 and closely related to the motor. The standpipe 96 also includes a dryer 104 connected with the upper end thereof and a pipe or conduit 106 extends from the dryer 104 to an analyzer such as a hot wire analyzer for analyzing the gases removed from the drilling fluid in a well known manner. As illustrated in FIG. 2, the top plate 36 includes a center aperture 108 which receives the shaft 31 with the coupling 32 located slightly below the top plate so air enters hole 108. Also, a washer 110 of rubber or other material is mounted on the central reduced area of the coupling 32 which serves as a slinger to prevent the drilling fluid from climbing up the shaft 31.

This structure enables the gas trap to be mounted in the shale shaker box with the trap having features which enable it to be mounted in small boxes, odd shaped boxes and the like due to the capability of rotating the trap discharge 24 so that it will fit the particular shaker box. By merely loosening the fasteners for the cams, the can 18 may be easily rotated for repositioning the discharge 24 without removing the gas trap from the shaker box. In operation, a vacuum is induced on the trap at all times through the standpipe thus evacuating accumulated gases for analyses purposes. The shaft 26 and plastic fingers 28 thereon serve as a pump to agitate the drilling fluid so that it moves from the inlet 22 upwardly and out of the outlet 24. The plastic material from which the fingers 28 is constructed of urethane or similar plastic material which is resistant to acid corrosion and the like and resistant to abrasion thereby providing long and useful life to the rotating fingers while immersed in the drilling fluid which frequently has acid constituents, abrasive cuttings and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A gas trap for removing, collecting and discharging gases from a drilling fluid whereby a portion of the gases may be analyzed, said gas trap comprising a generally vertically disposed can having a bottom inlet and a side outlet for drilling fluid, a shaft depending into the can and drivingly connected to a motor disposed above the can, a plurality of radially extending fingers on the shaft in engagement with drilling fluid to agitate the drilling fluid and facilitate separation of gases therefrom, said can including a top member closing the upper end thereof with the shaft extending centrally therethrough, a standpipe communicated with the interior of the can through the top member to subject the interior of the can to a vacuum and discharge gases collected in the can to an analyzer, means connecting the can to the top member in a secure but releasable manner to enable the can to be rotated about a vertical axis in order to orient the side outlet in desired angular relationship about the center of the can and means supporting the top member and the can, standpipe, motor and shaft in desired vertical relationship to the surface of a drilling fluid.

2. The structure as defined in claim 1 wherein said means connecting the can to the top member includes a plurality of generally U-shaped cam latch structures interconnecting the top member and can and manually actuated fastening means associated with each cam latch to selectively secure and release the can, each of said U-shaped cam latches being mounted on the can by the fastening means with one end of the cam latch being tightly engaged with the top member when the fastening means is tightened and loosely engaged with the top member when the fastening means is loosened thereby retaining the can assembled with respect to the top member but enabling it to be rotated without separation from the top member.

3. The structure as defined in claim 2 wherein said top member includes a depending peripheral flange telescopically receiving the upper end of the can thus retaining the can assembled and aligned with the top member, the outer surface of the flange on the top member including a circumferential groove slidably receiving the end portion of one leg of the U-shaped cam latch with a plurality of circumferentially spaced fastening means being provided between the can and the top member.

4. The structure as defined in claim 1 wherein said supporting means includes a mounting bracket in the form of a horizontally disposed and elongated downwardly opening channel shaped member adapted to straddle the upper edge of the vertical wall of a shaker box, and adjustable bolt members associated with the bracket to position the gas trap so that the can will be substantially vertically disposed.

5. The structure as defined in claim 1 wherein said fingers on the shaft are oriented adjacent only the lower end thereof and generally between the inlet and outlet with each of the fingers being constructed of plastic material resistant to corrosion and abrasive wear.

6. The structure as defined in claim 5 wherein said fingers extend diametrically and vertically adjacent fingers are angularly displaced 90 degrees.

7. The structure as defined in claim 5 wherein the shaft includes a coupler disposed in the can adjacent the top member, and a slinger in the form of a resilient washer mounted on said coupler to prevent upward movement of drilling fluid along the shaft.

* * * * *